United States Patent
Burtch

(10) Patent No.: US 12,479,362 B2
(45) Date of Patent: Nov. 25, 2025

(54) METHOD FOR ALERTING A DRIVER TO OBJECTS LEFT ON A VEHICLE ROOF AND ALERT SYSTEM

(71) Applicant: Continental Autonomous Mobility US, LLC, Auburn Hills, MI (US)

(72) Inventor: Joseph Burtch, Lake Orion, MI (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 171 days.

(21) Appl. No.: 18/541,335

(22) Filed: Dec. 15, 2023

(65) Prior Publication Data

US 2025/0196768 A1    Jun. 19, 2025

(51) Int. Cl.
| | |
|---|---|
| *B60Q 9/00* | (2006.01) |
| *G06V 20/58* | (2022.01) |
| *G06V 40/10* | (2022.01) |
| *G06V 40/20* | (2022.01) |
| *H04N 7/18* | (2006.01) |

(52) U.S. Cl.
CPC ............... *B60Q 9/00* (2013.01); *G06V 20/58* (2022.01); *G06V 40/11* (2022.01); *G06V 40/28* (2022.01); *H04N 7/188* (2013.01)

(58) Field of Classification Search
CPC .......... B60Q 9/00; G06V 20/58; G06V 40/11; G06V 40/28; G06V 20/52; H04N 7/188; G08B 21/22; G08B 21/24
See application file for complete search history.

(56) References Cited

U.S. PATENT DOCUMENTS

| | | | |
|---|---|---|---|
| 6,163,250 A | 12/2000 | Moskowitz | |
| 10,037,033 B2 | 7/2018 | Yako | |
| 11,173,819 B2 | 11/2021 | Koller | |
| 2005/0063564 A1* | 3/2005 | Yamamoto | G06V 40/28 701/1 |
| 2006/0087412 A1* | 4/2006 | Umeo | G01S 13/56 340/552 |
| 2006/0119141 A1* | 6/2006 | Queveau | B60J 7/143 296/216.01 |
| 2006/0149452 A1 | 7/2006 | Sawamoto | |
| 2017/0080900 A1 | 3/2017 | Huennekens | |
| 2020/0320309 A1 | 10/2020 | Nagata | |
| 2020/0394393 A1 | 12/2020 | Kraft | |

FOREIGN PATENT DOCUMENTS

| | | |
|---|---|---|
| DE | 102019105275 A1 | 9/2020 |
| JP | 2006338535 A | 12/2006 |
| JP | 2020052639 A | 4/2020 |
| WO | 2015025435 A1 | 2/2015 |
| WO | 2020178035 A1 | 9/2020 |

OTHER PUBLICATIONS

The International Search Report and the Written Opinion of the International Searching Authority mailed on Mar. 3, 2025 for the counterpart PCT Application No. PCT/US2024/059920.

* cited by examiner

*Primary Examiner* — Behrang Badii

(57) ABSTRACT

A method for alerting a driver to objects left on a vehicle roof includes obtaining image data of an environment surrounding the vehicle. The image data includes a sequence of images captured by a camera. The method further includes detecting a person within the image data, and determining whether the person raised at least one arm above the vehicle roof, based on the image data. The method further includes generating a notification based on determining that the person raised at least one arm above the vehicle roof.

20 Claims, 3 Drawing Sheets

METHOD FOR ALERTING A DRIVER TO OBJECTS LEFT ON A VEHICLE ROOF AND ALERT SYSTEM

TECHNICAL FIELD

Various embodiments relate to methods for alerting a driver to objects left on a vehicle roof, and alert systems for alerting a driver to objects left on a vehicle roof.

BACKGROUND

The vehicle roof is at a convenient height for vehicle drivers to temporarily place objects on. For example, coming out of a supermarket, a driver may place his bag on the vehicle roof while packing his groceries into the car. Sometimes, a driver may forget about the object that he or she placed on the vehicle roof. If the driver drives off without retrieving the object left on the vehicle roof, the object will likely drop off on the road. Not only is the object likely to be badly damaged, but the object may also pose a road safety danger if it hits another road driver such as a person, a car or a bicycle. As such, there is a need for a method to alert the vehicle driver about objects left on the vehicle roof.

SUMMARY

According to various embodiments, there is provided a method for alerting a driver to objects left on a vehicle roof. The method includes obtaining image data of an environment surrounding the vehicle. The image data includes a sequence of images captured by a camera. The method further includes detecting a person within the image data, determining whether the person raised at least one arm above the vehicle roof, based on the image data. The method further includes generating a notification based on determining that the person raised at least one arm above the vehicle roof.

According to various embodiments, there is provided an alert system for alerting a driver to objects left on the vehicle roof. The alert system includes a processor and a notification generator. The processor is configured to obtain image data of an environment surrounding the vehicle. The image data includes a sequence of images. The processor is further configured to detect a person within the image data. The processor is further configured to determine whether the person raised at least one arm above the vehicle roof, based on the image data. The notification generator is configured to generate a notification based on the processor determining that the person raised at least one arm above the vehicle roof.

Additional features for advantageous embodiments are provided in the dependent claims.

Other objects, features and characteristics, as well as the methods of operation and the functions of the related elements of the structure, the combination of parts and economics of manufacture will become more apparent upon consideration of the following detailed description and appended claims with reference to the accompanying drawings, all of which form a part of this specification. It should be understood that the detailed description and specific examples, while indicating the non-limiting embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DESCRIPTION

Figure 1:
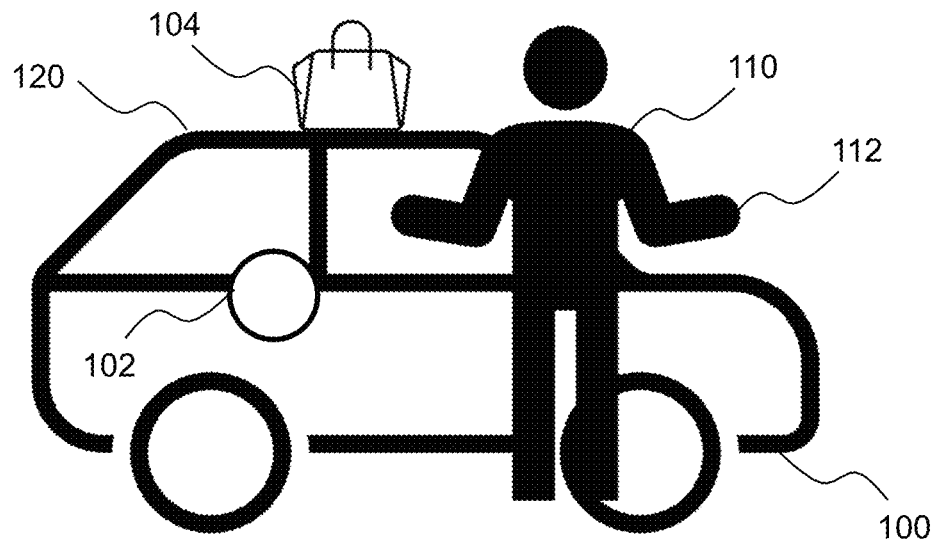
FIG. 1 is a picture of a person and a vehicle.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

Embodiments described below in context of the devices are analogously valid for the respective methods, and vice versa. Furthermore, it will be understood that the embodiments described below may be combined, for example, a part of one embodiment may be combined with a part of another embodiment.

It will be understood that any property described herein for a specific alert system may also hold for any alert system described herein. It will be understood that any property described herein for a specific method may also hold for any method described herein. Furthermore, it will be understood that for any system or method described herein, not necessarily all the components or steps described must be enclosed in the device or method, but only some (but not all) components or steps may be enclosed.

The term "coupled" (or "connected") herein may be understood as electrically coupled or as mechanically coupled, for example attached or fixed, or just in contact without any fixation, and it will be understood that both direct coupling or indirect coupling (in other words: coupling without direct contact) may be provided.

In this context, the device as described in this description may include a memory which is for example used in the processing carried out in the device. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In order that the invention may be readily understood and put into practical effect, various embodiments will now be described by way of examples and not limitations, and with reference to the figures.

FIG. 1 is a picture of a person 110 and a vehicle 100. The person 110 has placed an object 104, for example a bag, on the vehicle roof 120. In doing so, the driver raised his arms, such that his hands 112 went above the vehicle roof 120. In other words, the driver raised his arms above the vehicle roof 120. The driver can be said to have raised his arms above the vehicle roof 120 when part of his forearm is above the vehicle roof 120. Before he raised his arms, the object 104 was in his hands 112, for example, he may have held the object 104 in one hand 112 or in both hands 112. The camera 102 may capture images of the person 110's actions. The output of the camera 102 is referred herein as image data. The image data may include a sequence of still images, or a video.

The camera 102 may be part of the surround view camera system of the vehicle 100. In other words, the camera 102 may be part of a constellation of cameras mounted on various positions of the vehicle 100. The camera 102 may also include more than one camera of the surround view camera system. By utilizing the existing surround view camera system of the vehicle for obtaining the image data, the vehicle 100 need not be equipped with additional sensors to perform the alert function.

A processor may analyze the image data captured by the camera 102, to determine if a person 110 stood near to the vehicle 100, and whether the person 110 lifted his/her hands or arms above the vehicle roof 120. The processor 102 may also analyze the image data 102, to determine if the person 110 was holding an object 104 before he lifted his arms, and whether the person 110's hands 112 were empty when the person 110 put his hands 112 down.

A notification generator in the vehicle 100 may generate an alert, in response to the processor having detected that the person 110 had lifted his hands or arms up above the vehicle roof 120. For higher accuracy, the notification generator may generate the alert only if the processor detected that the person 110 had lifted his hands up with an object 104, and then put down his hands without the object 104. The alert may include a visual alert, for example, a text such a "Item left on the roof?", displayed in the vehicle. The alert may include an audio alert, for example, an audio message emitted from speakers in the vehicle. The alert may communicate to the vehicle driver, the possibility that an object has been left on the roof. The notification generator may generate the alert, only after the driver enters the vehicle 100, and then closes the vehicle door. The processor may detect the driver entering the vehicle 100 by processing the image data. There is a possibility that the driver is about to drive off without retrieving the object 104 on the vehicle roof 120, and hence it is timely for the notification generator to generate the alert.

The person 110 can only place an object 104 on the vehicle roof 120 when the vehicle 100 is stationary. Consequently, the above-described method for alerting the driver may be deployed when the vehicle 100 has not yet been started, or after the vehicle 100 has been powered down. The camera 102 and the processor may be activated for detecting a person 110 placing an object 104 on the vehicle roof 120, only when a set of turn-on conditions are fulfilled, so as to conserve electricity usage. These turn-on conditions may include, for example, when the vehicle 100 is powered down and then the vehicle door is opened. This indicates that the driver has stopped the vehicle 100 and an occupant of the vehicle may have exited the vehicle 100. The turn-on conditions may include, for example, when a key fob is detected while the vehicle 100 is still turned off. The key fob may be detected by a transceiver onboard the vehicle 100, when the key fob is within communication range with the transceiver. This may indicate that the driver who has exited the vehicle 100 is returning to the vehicle 100. The turn-on conditions may also include, detecting that the communication signal strength between the key fob and the transceiver is increasing. This happens when the key fob is getting closer to the vehicle 100 and may indicate that the driver is approaching the vehicle 100. This may minimize scenarios where other pedestrians who walk past the vehicle 100 are detected as the driver or user of the vehicle 100. The key fob may be a portable device that allows the driver to wirelessly unlock the vehicle doors.

Conversely, the camera 102 and the processor may be deactivated to stop detecting a person 110 placing an object 104 on the vehicle roof 120, when a set of turn-off conditions are fulfilled. The turn-off conditions may include, for example, when the vehicle 100 is moving, as it is unlikely that objects can be placed on the vehicle roof 120 while the vehicle is on the move. The turn-off conditions may include, for example, absence of communication with the key fob. This may indicate that the driver has walked away from the vehicle 100, and hence will not be in close distance with the vehicle to put an object on the vehicle 100.

Figure 2:
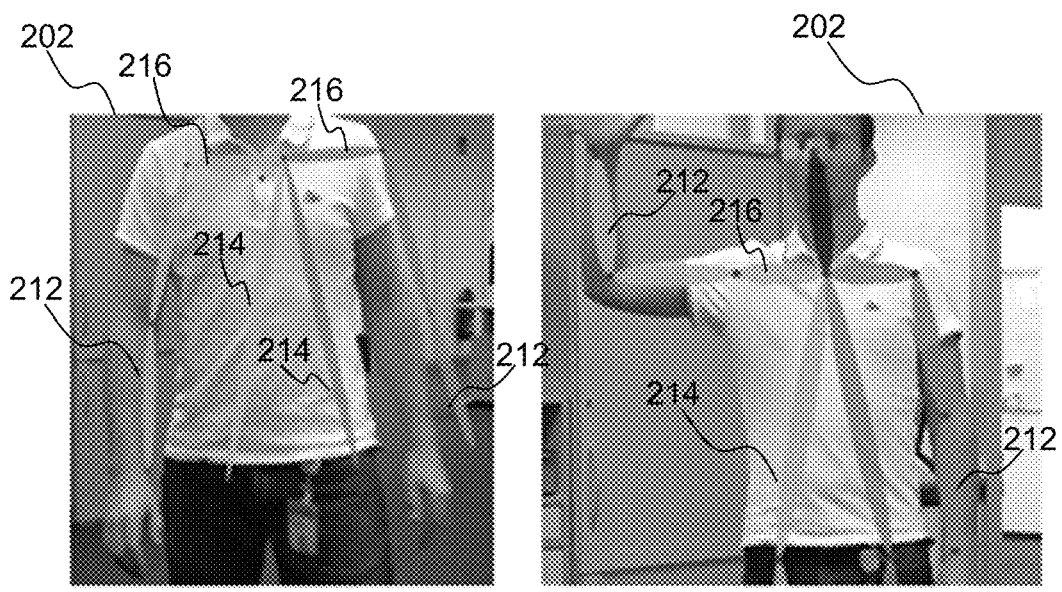
FIG. 2 shows post-processed images of a person for detecting the person's movements.

FIG. 2 shows post-processed images of a person for detecting the person's movements. In image 202, a person is shown standing with his arms by his side. The image 202 is processed to detect a skeletal structure of the person, for example, his torso represented by keypoints 214, his shoulders represented by keypoints 216, and his forearms represented by keypoints 212. A processor onboard the vehicle 100 may detect that the person lifted his arms up above the vehicle roof 120 based on changes in position of the keypoints 212 representing the forearms. Similarly, the processor may also detect that the person has put down his arms based on changes in position of the keypoints 212.

Figure 3:
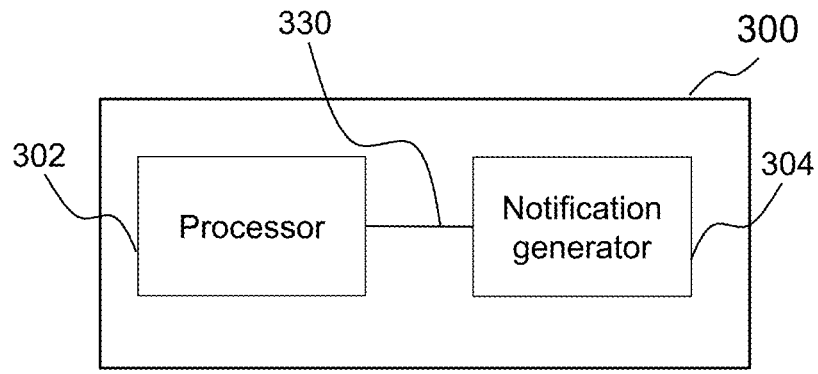
FIG. 3 shows a block diagram of an alert system according to various embodiments.

FIG. 3 shows a block diagram of an alert system 300 according to various embodiments. The alert system 300 may be used to alert a driver to objects left on the vehicle roof 120. The alert system 300 may include a processor 302 and a notification generator 304. The processor 302 may be configured to obtain image data of an environment surrounding the vehicle 100. The image data may include a sequence of images. The processor 302 may be further configured to detect a person within the image data. The processor 302 may be further configured to determine whether the person 110 raised at least one arm above the vehicle roof 120, based on the image data. The notification generator 304 may be configured to generate a notification based on the processor 302 determining that the person 110 raised at least one arm above the vehicle roof 120. The processor 302 and the notification generator 304 may be coupled, electrically and/or mechanically, by coupling line 330. In example embodiments, the processor 302 is configured by executing an algorithm implemented as software program code stored in memory to which the processor 302 is communicatively coupled. In particular, the software program code includes program code instructions which, when executed by the processor 302, causes the processor 302 to perform processes/operations described herein, including the processes/operations described below with respect to FIG. 5.

According to various embodiments, the processor 302 may be configured to determine whether the person 110 raised at least one arm above the vehicle roof 120 by identifying the person's hands within the image data, and tracking position of the person's hands across the sequence of images.

According to various embodiments, the processor 302 may be configured to determine whether the person 110 raised at least one arm above the vehicle roof 120 by recognizing keypoints of a skeletal structure of the person 110 within the image data, and tracking positions of at least one of the recognized keypoints across the sequence of images. This is for example, described with respect to FIG. 2.

According to various embodiments, the processor 302 may be further configured to detect presence of an object 104 in at least one of the person's hands 112 within a frame (also referred herein as earlier frame) of the image data when the person's hands 112 were moving towards the vehicle roof 120. The processor 302 may be further configured to detect absence of the object 104 in the person's hands 112 within a further frame of the image data when the person's hands 112 were moving away from the vehicle roof 120. The further frame may be subsequent to the earlier frame, in other words, occurs later than the earlier frame. The notification generator 304 may be configured to generate the notification further based on the detection of presence of the object 104 followed by the subsequent detection of absence of the object 104. The detection of the presence and absence of the object 104 may be performed using known methods to the person skilled in the art, for example, using image recognition techniques, neural networks such as Convolutional Neural Network (CNN) and others.

Figure 4:
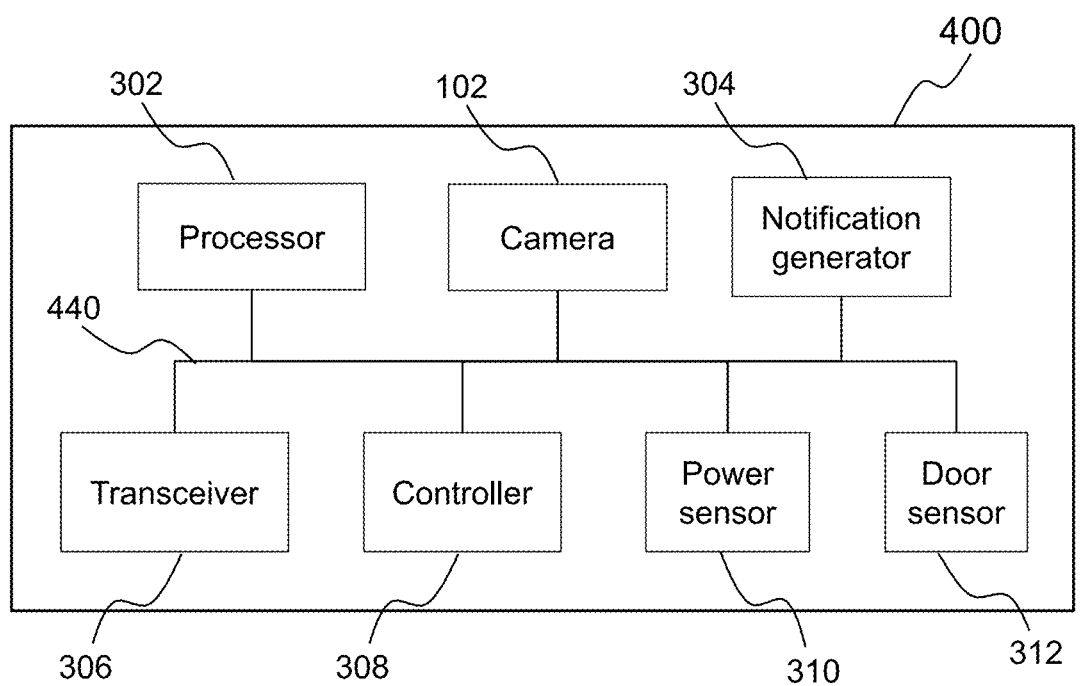
FIG. 4 shows a block diagram of an alert system according to various embodiments.

FIG. 4 shows a block diagram of an alert system 400 according to various embodiments. Like the alert system 300, the alert system 400 may include the processor 302 and the notification generator 304. The alert system 400 may further include at least one of: a camera 102, a transceiver 306, a controller 308, a power sensor 310 and a door sensor 312. The processor 302, the notification generator 304, the camera 102, the transceiver 306, the controller 308, the power sensor 310 and the door sensor 312 may be coupled, electrically and/or mechanically, by coupling lines 440.

The camera 102 may be configured to capture the image data of the environment surrounding the vehicle 100. The camera 102 may include a camera positioned on a side of the vehicle 100. The camera 102 may include a camera system that includes multiple cameras, such as a surround view camera system, where each camera is mounted on a separate position on the vehicle 100.

The transceiver 306 may be configured to detect communication between a key fob and the vehicle 100. The controller 308 may be configured to control the processor 302 to initiate obtaining image data of the environment based on detection of the communication by the transceiver 306. The detection of communication between the key fob and the vehicle occurs when the key fob is in close range to the vehicle 100, indicating that the driver of the vehicle 100 may be approaching the vehicle. The controller 308 may be configured to control the processor 302, to additionally or alternatively, to detect movement of the person's hands 112, based on detection of the communication by the transceiver 306. The controller 308 controls the operation of the processor 302 according to the detection of the communication so that the processor 302 is activated only when necessary, for the conservation of battery or electrical power of the vehicle 100.

The controller 308 may be further configured to turn on the camera 102 based on detection of the communication by the transceiver 306. This controls the camera 102 to operate only when necessary, so as to conserve the power consumed by the camera 102.

The transceiver 306 may be further configured to detect absence of communication between the key fob and the vehicle. The detection of absence of communication between the key fob and the vehicle occurs when the key fob is out of communication range with the vehicle 100, indicating that the driver of the vehicle 100 may have walked away from the vehicle. The controller 308 may be further configured to control the processor 302 to stop obtaining image data of the environment of the vehicle 100 based on detection of absence of the communication by the transceiver 306. The controller 308 may be further configured to control the processor 302, additionally or alternatively, to stop determining whether the person raised at least one arm above the vehicle roof 120, based on detection of absence of the communication by the transceiver 306. With the driver having walked away from being reachable distance to the vehicle 100, the likelihood of an object being accidentally left on the vehicle 100 is reduced, and hence the processor 302 may be deactivated to conserve electrical power.

The power sensor 310 may be configured to detect power down of the vehicle propulsion system. The vehicle propulsion system may include a combustion engine, or an electric motor. In other words, the power sensor 310 may be configured to detect that the vehicle 100 is shut down. The controller 308 may be configured to control the processor 302 to initiate obtaining image data of the environment of the vehicle 100 based on detection of the power down of the vehicle propulsion system by the power sensor 310. The controller 308 may be configured to control the processor 302 to initiate, additionally or alternatively, determining whether the person raised at least one arm above the vehicle roof 120, based on detection of the power down of the vehicle propulsion system by the power sensor 310.

The door sensor 312 may be configured to detect opening of the vehicle doors after detection of the power down of the vehicle propulsion system by the power sensor 310. The controller 308 may be configured to control the processor 302 to initiate at least one of obtaining image data of the environment and determining whether the person raised at least one arm above the vehicle roof 120, based on both the detection of the power down of the vehicle propulsion system and the detection of the opening of the vehicle doors.

The power sensor 310 may be further configured to detect power on of the vehicle propulsion system. The controller 308 may be further configured to control the processor 302 to stop at least one of obtaining image data of the environment and determining whether the person raised at least one arm above the vehicle roof 120, based on detection of the power on of the vehicle propulsion system by the power sensor 310.

Figure 5:
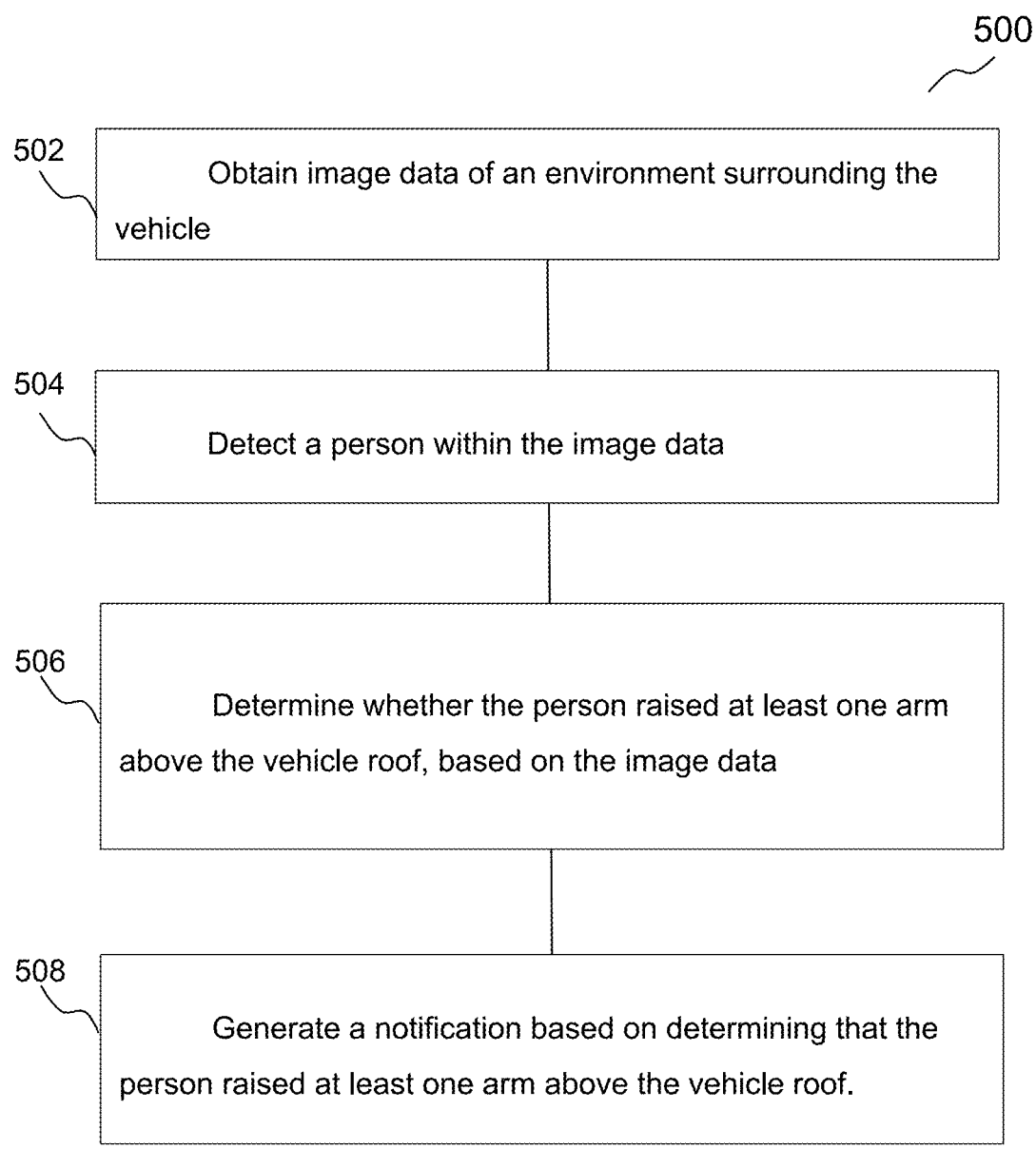
FIG. 5 shows a flow diagram of a method for alerting a driver to objects left on a vehicle roof, according to various embodiments.

FIG. 5 shows a flow diagram of a method 500 for alerting a driver to objects left on a vehicle roof, according to various embodiments. The method 500 may include processes 502, 504, 506 and 508. Process 502 may include obtaining image data of an environment surrounding the vehicle 100, the image data including a sequence of images captured by a camera 102. The process 504 may include detecting a person within the image data. The process 506 may include determining whether the person raised at least one arm above the vehicle roof 120, based on the image data. The process 508 may include generating a notification based on determining that the person raised at least one arm above the vehicle roof 120.

The foregoing description shall be interpreted as illustrative and not be limited thereto. One of ordinary skill in the art would understand that certain modifications may come within the scope of this disclosure. Although the different non-limiting embodiments are illustrated as having specific components or steps, the embodiments of this disclosure are not limited to those combinations. Some of the components or features from any of the non-limiting embodiments may be used in combination with features or components from any of the other non-limiting embodiments. For these reasons, the appended claims should be studied to determine the true scope and content of this disclosure.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Reference to an element in the singular is not intended to mean "one and only one" unless specifically so stated, but rather "one or more." Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims.

The invention claimed is:

1. A method for alerting a driver to objects left on a vehicle roof, the method comprising:
   obtaining image data of an environment surrounding the vehicle, the image data comprising a sequence of images captured by a camera;
   detecting a person in the image data;
   determining whether the person raised at least one arm above the vehicle roof, based on the image data; and
   generating a notification based on determining that the person raised at least one arm above the vehicle roof.

2. The method of claim 1, wherein determining whether the person raised at least one arm above the vehicle roof comprises detecting that the person's arm moves out of a field of view of the camera.

3. The method of claim 1, wherein determining whether the person raised at least one arm above the vehicle roof comprises
   identifying the person's hands within the image data, and
   tracking position of the person's hands across the sequence of images.

4. The method of claim 1, wherein determining whether the person raised at least one arm above the vehicle roof comprises
   recognizing keypoints of a skeletal structure of the person within the image data, and
   tracking positions of at least one of the recognized keypoints across the sequence of images.

5. The method of claim 1, further comprising:
   detecting presence of an object in at least one of the person's hands within a frame of the image data when the person's hands were moving towards the vehicle roof;
   detecting absence of the object in the person's hands within a further frame of the image data when the person's hands were moving away from the vehicle roof, wherein the further frame is subsequent to the frame; and
   generating the notification further based on the detection of presence of the object followed by the subsequent detection of absence of the object.

6. The method of claim 1, further comprising:
   detecting communication between a key fob and the vehicle, and
   wherein at least one of obtaining image data of the environment and detecting movement of the person's hands, is initiated based on detection of the communication.

7. The method of claim 6, further comprising at least one of:
   turning on the camera based on detection of the communication; and
   detecting absence of communication between the key fob and the vehicle and stopping at least one of obtaining image data of the environment and determining whether the person raised at least one arm above the vehicle roof, based on detection of absence of the communication.

8. The method of claim 1, further comprising:
   detecting power down of the vehicle propulsion system;
   wherein at least one of obtaining image data of the environment and determining whether the person raised at least one arm above the vehicle roof, is initiated based on detection of the power down of the vehicle propulsion system.

9. The method of claim 8, further comprising:
   detecting opening of the vehicle doors after detection of the power down of the vehicle propulsion system,
   wherein at least one of obtaining image data of the environment and determining whether the person raised at least one arm above the vehicle roof, is initiated based on both the detection of the power down of the vehicle propulsion system and the detection of the opening of the vehicle doors.

10. The method of claim 8, further comprising:
    detecting power on of the vehicle propulsion system; and
    stop at least one of obtaining image data of the environment and determining whether the person raised at least one arm above the vehicle roof, based on detection of the power on of the vehicle propulsion system.

11. An alert system for alerting a driver to objects left on the vehicle roof, the alert system comprising:
    a processor configured to obtain image data of an environment surrounding the vehicle, the image data comprising a sequence of images,
    wherein the processor is further configured to detect a person within the image data,
    wherein the processor is further configured to determine whether the person raised at least one arm above the vehicle roof, based on the image data; and
    a notification generator configured to generate a notification based on the processor determining that the person raised at least one arm above the vehicle roof.

12. The alert system of claim 11, further comprising:
    a camera configured to capture the image data of the environment surrounding the vehicle.

13. The alert system of claim 11, wherein the processor is configured to determine whether the person raised at least one arm above the vehicle roof by at least one of:
    (a) identifying the person's hands within the image data, and tracking position of the person's hands across the sequence of images, and
    (b) recognizing keypoints of a skeletal structure of the person within the image data, and tracking positions of at least one of the recognized keypoints across the sequence of images.

14. The alert system of claim 11, wherein the processor is further configured to detect presence of an object in at least one of the person's hands within a frame of the image data when the person's hands were moving towards the vehicle roof, and wherein the processor is further configured to detect absence of the object in the person's hands within a further frame of the image data when the person's hands were moving away from the vehicle roof, the further frame being subsequent to the frame, and wherein the notification generator is configured to generate the notification further based on the detection of presence of the object followed by the subsequent detection of absence of the object.

15. The alert system of claim 11, further comprising:
a transceiver configured to detect communication between a key fob and the vehicle, and
a controller configured to control the processor to initiate at least one of obtaining image data of the environment and detecting movement of the person's hands, based on detection of the communication by the transceiver.

16. The alert system of claim 15, wherein the controller is further configured to turn on the camera based on detection of the communication by the transceiver.

17. The alert system of claim 15, wherein the transceiver is further configured to detect absence of communication between the key fob and the vehicle, and wherein the controller is further configured to control the processor to stop at least one of obtaining image data of the environment and determining whether the person raised at least one arm above the vehicle roof, based on detection of absence of the communication by the transceiver.

18. The alert system of claim 11, further comprising:
a power sensor configured to detect power down of the vehicle propulsion system; and
a controller configured to control the processor to initiate at least one of obtaining image data of the environment and determining whether the person raised at least one arm above the vehicle roof, based on detection of the power down of the vehicle propulsion system by the power sensor.

19. The alert system of claim 18, further comprising:
a door sensor configured to detect opening of the vehicle doors after detection of the power down of the vehicle propulsion system by the power sensor,
wherein the controller is configured to control the processor to initiate at least one of obtaining image data of the environment and determining whether the person raised at least one arm above the vehicle roof, based on both the detection of the power down of the vehicle propulsion system and the detection of the opening of the vehicle doors.

20. The alert system of claim 18, wherein the power sensor is further configured to detect power on of the vehicle propulsion system, and wherein the controller is further configured to control the processor to stop at least one of obtaining image data of the environment and determining whether the person raised at least one arm above the vehicle roof, based on detection of the power on of the vehicle propulsion system by the power sensor.

* * * * *